(12) United States Patent
Abali et al.

(10) Patent No.: US 10,291,468 B2
(45) Date of Patent: May 14, 2019

(54) MANAGING COMPUTING DEVICES IN A COMPUTING SYSTEM

(71) Applicant: LENOVO ENTERPRISE SOLUTIONS (SINGAPORE) PTE. LTD., Singapore (SG)

(72) Inventors: Bulent Abali, Tenafly, NJ (US); Makoto Ono, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 350 days.

(21) Appl. No.: 14/708,796

(22) Filed: May 11, 2015

(65) Prior Publication Data

US 2016/0337446 A1   Nov. 17, 2016

(51) Int. Cl.
*H04L 29/08* (2006.01)
*H04L 12/24* (2006.01)
*H04N 7/00* (2011.01)
*H04L 12/26* (2006.01)

(52) U.S. Cl.
CPC ...... *H04L 41/0816* (2013.01); *H04L 43/0817* (2013.01); *H04L 67/00* (2013.01); *H04N 7/00* (2013.01)

(58) Field of Classification Search
CPC ......... H04L 67/10; H04L 43/08; H04L 43/00; H04L 67/00; H04N 7/181; H04N 7/00; G06F 15/177; G06F 11/00; G06F 15/00
See application file for complete search history.

(56) References Cited

U.S. PATENT DOCUMENTS

| | | | |
|---|---|---|---|
| 2002/0118114 A1* | 8/2002 | Ohba | G01V 8/10 340/573.1 |
| 2004/0095467 A1* | 5/2004 | Koizumi | G08B 13/19656 348/169 |
| 2005/0010499 A1* | 1/2005 | Farkas | G06Q 10/087 705/28 |
| 2012/0124590 A1* | 5/2012 | Balakrishnan | G06F 1/206 718/103 |
| 2013/0050471 A1* | 2/2013 | Wang | G06F 1/20 348/125 |
| 2014/0258052 A1* | 9/2014 | Khuti | G06Q 10/087 705/28 |
| 2014/0270799 A1* | 9/2014 | Roberts | H04B 10/116 398/130 |

* cited by examiner

*Primary Examiner* — Maryam A Nasri

(57) ABSTRACT

Managing computing devices in a computing system, including: receiving image data from a plurality of image sensors, each image sensor coupled to a computing device in a computing system, wherein multiple computing devices in the computing system are coupled to multiple image sensors; identifying, in dependence upon the image data from the plurality of image sensors, one or more characteristics of the computing system; and initiating, in dependence upon the one or more characteristics of the computing system, one or more desired system management actions.

10 Claims, 8 Drawing Sheets

MANAGING COMPUTING DEVICES IN A COMPUTING SYSTEM

BACKGROUND OF THE INVENTION

Field of the Invention

The field of the invention is data processing, or, more specifically, methods, apparatus, and products for managing computing devices in a computing system and in a datacenter.

Description of Related Art

Modern computing systems can include many computing devices. The identity of the computing devices, the relative location of each computing device, and the location of each computing device within the computing system and datacenter are frequently unknown to each other and even unknown to system management modules, services, and servers. The relative location of each computing device and the location of each computing device within the computing system, however, can impact how each computing device operates. As such, the relative location of each computing device and the location of each computing device within the computing system can impact overall system performance.

SUMMARY OF THE INVENTION

Methods, apparatuses, and products for managing computing devices in a computing system, including: receiving image data from a plurality of image sensors, each image sensor coupled to a computing device in a computing system, wherein multiple computing devices in the computing system are coupled to multiple image sensors; identifying, in dependence upon the image data from the plurality of image sensors, one or more characteristics of the computing system; and initiating, in dependence upon the one or more characteristics of the computing system, one or more desired system management actions. Multiple images received from multiple sensors may be collated to virtually create an overall picture of the datacenter. Each image sensor and the associated devices may be known to each other. Therefore, once the images are collated, all the device locations in the datacenter may be identified relative to each other in the overall picture as well as in an X,Y,Z coordinate plane of the datacenter, therefore simplifying or enabling the systems management tasks such as inventorying, physical security, and thermal profiling.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
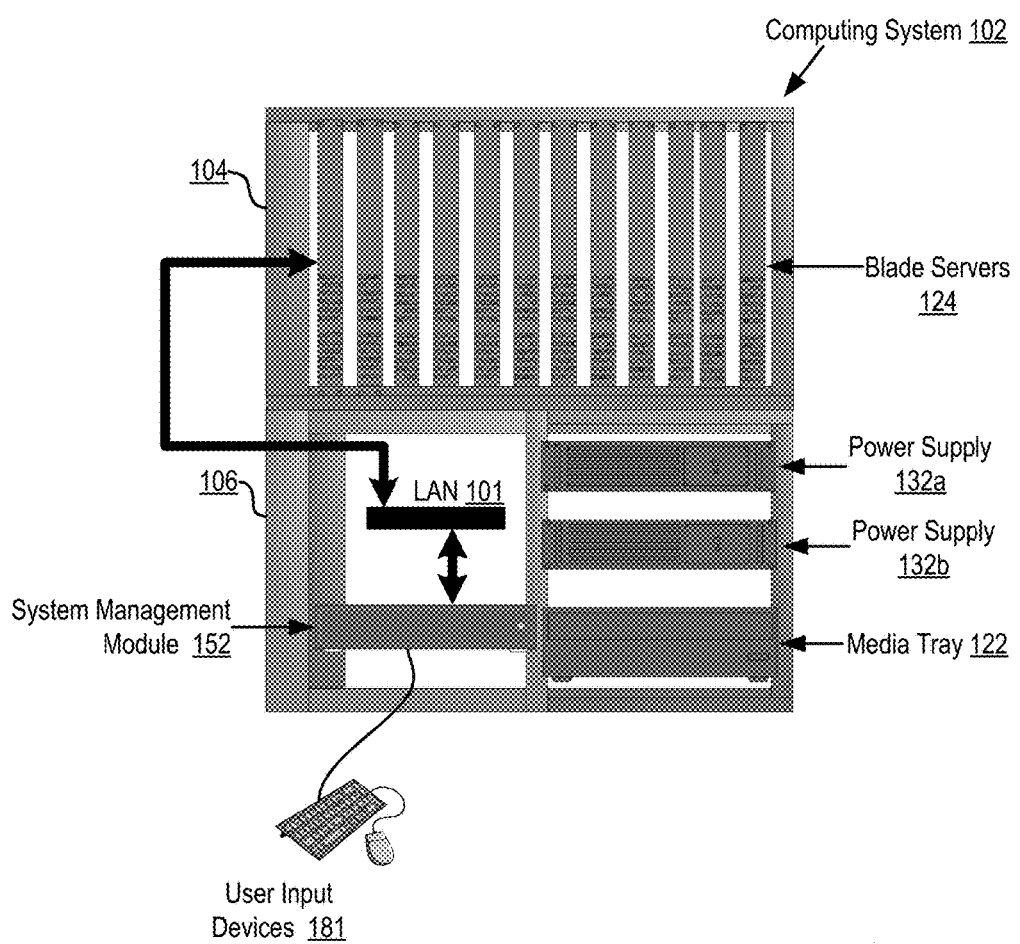
FIG. 1 sets forth a diagram of an example computing system in which computing devices are managed according to embodiments of the present invention.

Example methods, apparatus, and products for managing computing devices in a computing system in accordance with the present invention are described with reference to the accompanying drawings, beginning with FIG. 1. FIG. 1 sets forth a diagram of an example computing system (102) in which computing devices are managed according to embodiments of the present invention. The computing system (102) of FIG. 1 includes a plurality of computing devices that can receive power from a plurality of power supplies (132a, 132b). Each computing device represents a computing component such as a storage device, a blower, a blade server (124), or other power consuming computing component of the computing system (102).

The computing devices depicted in FIG. 1 can receive power from a plurality of power supplies (132a, 132b). Each power supply (132a, 132b) in FIG. 1 is a device that supplies electric power to an electrical load. Each power supply (132a, 132b) may be embodied, for example, as a switched mode power supply that transfers power from a source such as mains power to a load such as the computing devices, while converting voltage and current characteristics.

The computing system (102) of FIG. 1 is depicted as a chassis environment. A 'chassis environment,' as the term is used in this specification, refers generally to a blade server system. The blade server system in the example depicted in FIG. 1 is installed in a two-bay chassis (104, 106) and includes one or more of blade servers (124), one or more system management modules (152), one or more media trays (122), and one or more power supplies (132a, 132b). The computing system (102) of FIG. 1 therefore includes a plurality of computing devices, illustrated in this example as blade servers (124), the system management module (152), and the media tray (122), although readers will appreciate that in other embodiments additional computing devices may be included in the computing system (102), where each additional computing device can be embodied as any power consuming computing component of the chassis environment.

The system management module (152) of FIG. 1 may be embodied as a computer, including software and hardware components, one or more computer processors and computer memory, that provides system management functions for components in the example chassis environment, including the blade servers (124) and the media tray (122). The system management module (152) of FIG. 1 may also make available connections for user input devices such as mice or keyboards (181) that are not generally connected directly to the blade servers (124) or to the chassis itself.

The computing system (102) of FIG. 1 also includes one or more blade servers (124). The one or more blade servers (124) of FIG. 1 are installed in cabinet bay (104) of the example computing system (102). Such blade servers (124) are computing devices implemented in blade form factor. The blade servers (124) may share access to the media tray (122) and may be connected to one another and to the system management module (152) for data communications through a local area network ('LAN') (101), which may be embodied as a small network installed within the computing system (102).

The computing system (102) of FIG. 1 also includes one or more media trays (122). The one or more media trays (122) in FIG. 1 may house non-volatile memory media generally. A media tray (122) may typically include Compact Disc read-only media drives ('CD-ROM'), Digital Video Disc ROM drives (DVD-ROM), CD-RW drives, DVD-RW drives, floppy disk drives, and so on as will occur to those of skill in the art.

The arrangement of the chassis environment, network (101), and other devices making up the example computing system (102) illustrated in FIG. 1 are for explanation, not for limitation. Computing systems useful according to various embodiments of the present invention may include additional servers, routers, and other devices, not shown in FIG. 1, as will occur to those of skill in the art. Networks in such data processing systems may support many data communications protocols, including Transmission Control Protocol ('TCP'), Internet Protocol (IP), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Figure 2:
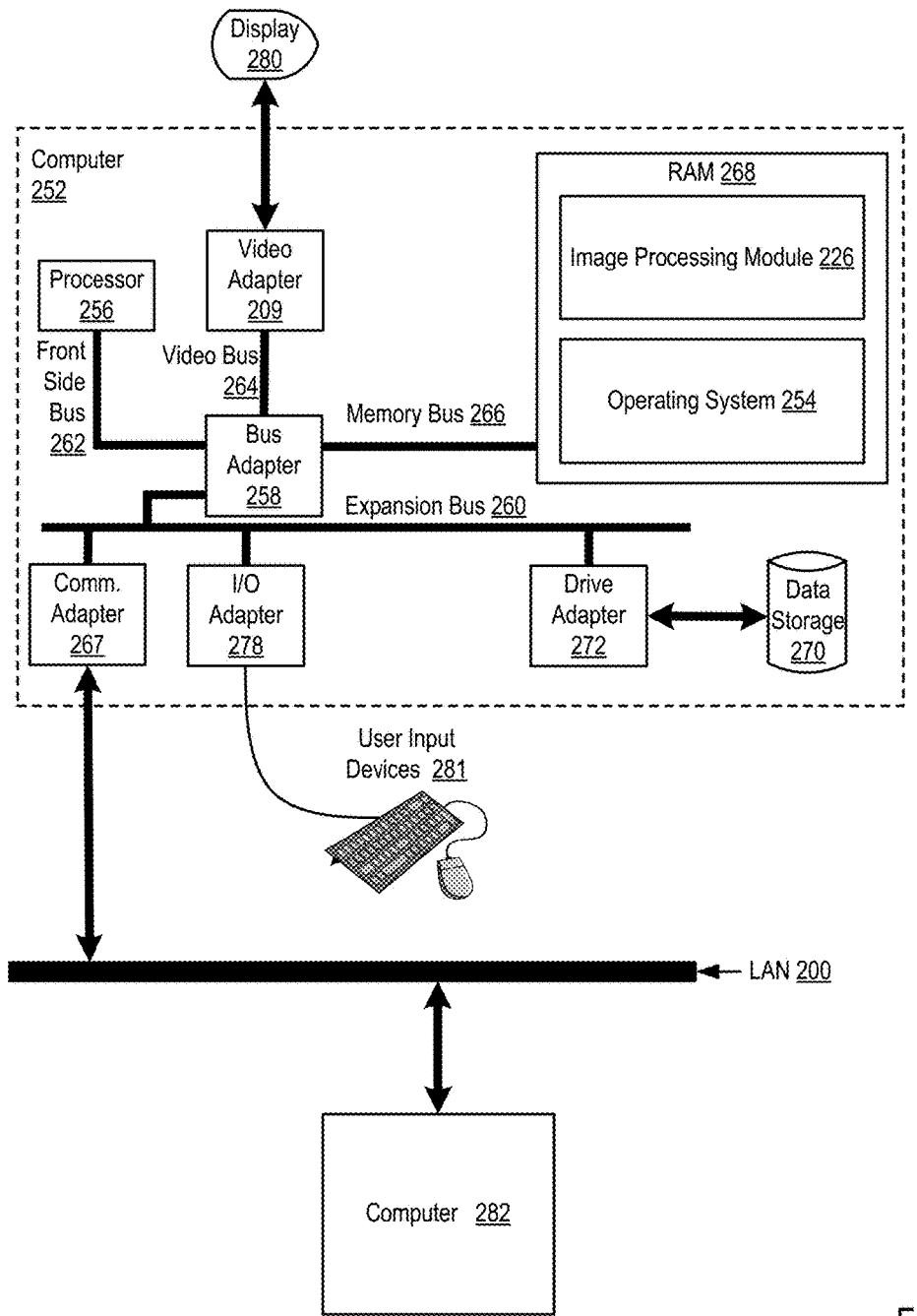
FIG. 2 sets forth a block diagram of automated computing machinery comprising an example computer useful in managing computing devices in a computing system according to embodiments of the present invention.

For further explanation, FIG. 2 sets forth a block diagram of automated computing machinery comprising an example computer (252) useful in managing computing devices in a computing system according to embodiments of the present invention. The computer (252) of FIG. 2 includes at least one computer processor (256) or 'CPU' as well as random access memory (268) ('RAM') which is connected through a high speed memory bus (266) and bus adapter (258) to processor (256) and to other components of the computer (252).

Stored in RAM (268) is an image processing module (226), a module of computer program instructions for managing computing devices in a computing system according to embodiments of the present invention. The image processing module (226) may be configured to manage computing devices in a computing system by receiving image data from a plurality of image sensors, identifying one or more characteristics of the computing system in dependence upon the image data from the plurality of image sensors, and initiating one or more desired system management actions in dependence upon the one or more characteristics of the computing system as described in greater detail below.

Also stored in RAM (268) is an operating system (254). Operating systems useful managing computing devices in a computing system according to embodiments of the present invention include UNIX™, Linux™, Microsoft XP™, AIX™, IBM's i5/OS™, and others as will occur to those of skill in the art. The operating system (254) and the image processing module (226) in the example of FIG. 2 are shown in RAM (268), but many components of such software typically are stored in non-volatile memory also, such as, for example, on a disk drive (270).

The computer (252) of FIG. 2 includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers for managing computing devices in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The example computer (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing computing devices in a computing system according to embodiments of the present invention include modems for wired dial-up communications, Ethernet (IEEE 802.3) adapters for wired data communications network communications, and 802.11 adapters for wireless data communications network communications.

Figure 3:
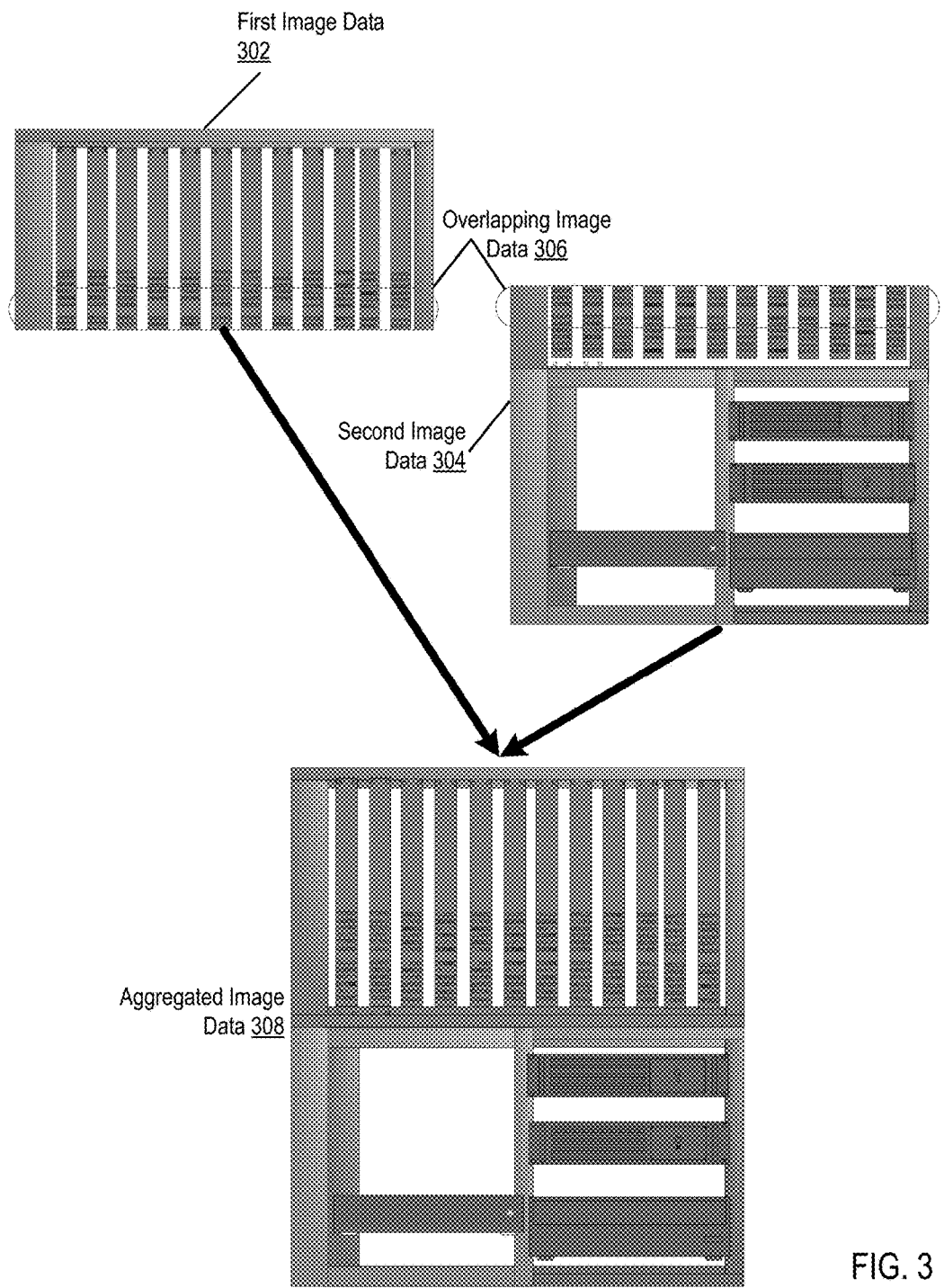
FIG. 3 sets forth an example of aggregated image data captured from a plurality of image sensors according to embodiments of the present invention.

For further explanation, FIG. 3 sets forth an example of aggregated image data (308) captured from a plurality of image sensors according to embodiments of the present invention. The aggregated image data (308) represents image data created by combining image data captured from a plurality of image sensors. The example depicted in FIG. 3 includes first image data (302) that is captured by a first image sensor (not shown) and second image data (304) that is captured by a second image sensor (not shown). In such an example, using image processing techniques the two images may be compared to identify overlapping image data (306). The overlapping image data (306) represents a portion of each image that has been identified as containing image data of the same computing devices or objects in the computing system. Because each set of image data (302, 304) includes overlapping image data (306), the two sets of image data (302, 304) can be overlaid to produce aggregated image data (308) that provides a more complete view of the computing system.

Figure 4:
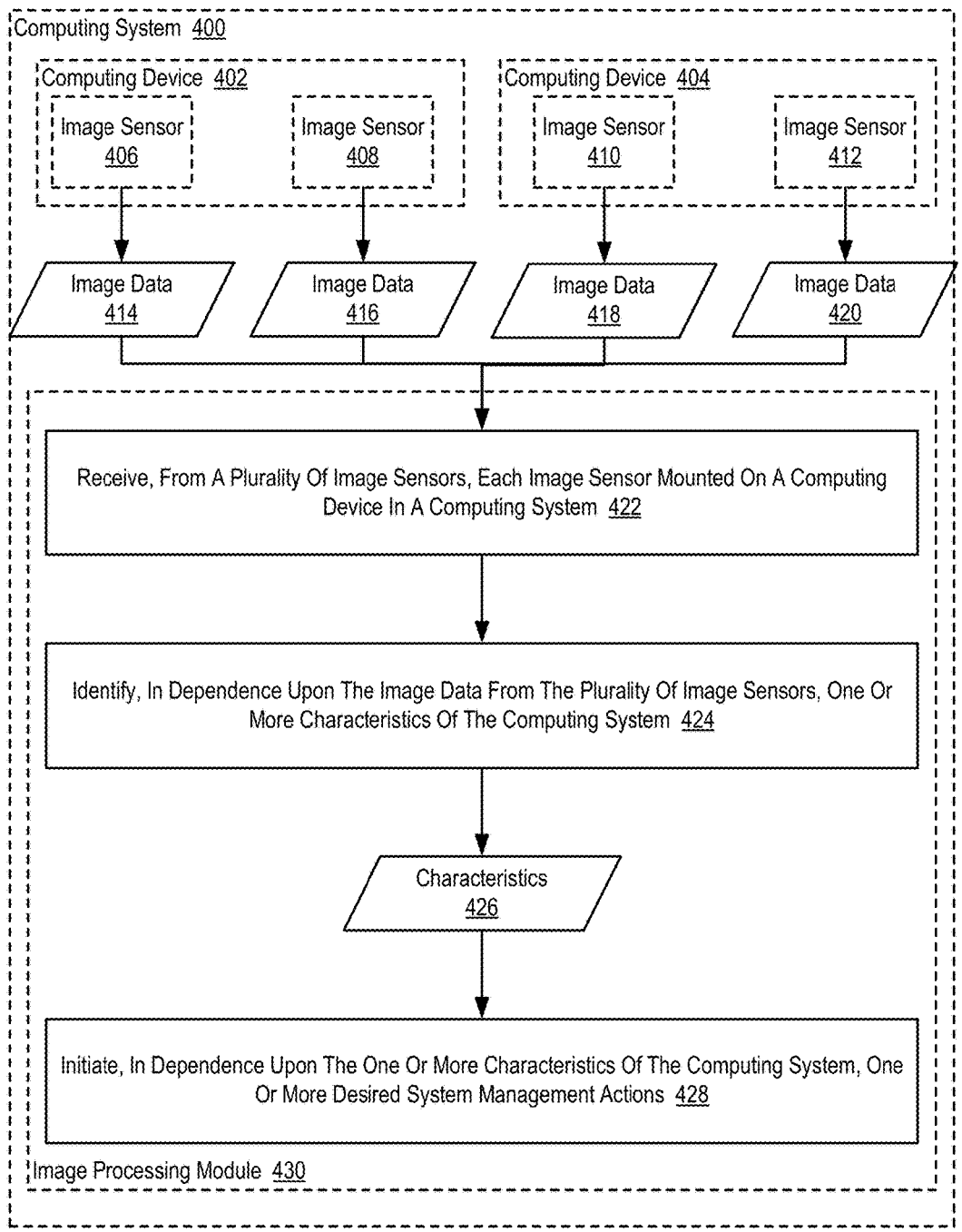
FIG. 4 sets forth a flow chart illustrating an example method for managing computing devices in a computing system according to embodiments of the present invention.

For further explanation, FIG. 4 sets forth a flow chart illustrating an example method for managing computing devices (402, 404) in a computing system (400) according to embodiments of the present invention. The example method depicted in FIG. 4 is carried out, at least in part, by an image processing module (430). The image processing module (430) depicted in FIG. 4 may be embodied, for example, as a module of computer program instructions executing on computer hardware such as a computer processor. The image processing module (430) may reside on dedicated computer hardware in the computing system (400) such as a server that carries out system management operations. As such, the image processing module (430) may reside on a computing device that is itself part of the computing system (400). Readers will appreciate that in other embodiments the image processing module (430) may reside on computer hardware that is external to the computing system (400).

The example method depicted in FIG. 4 can include receiving (422), by the image processing module (430), image data (414, 416, 418, 420) from a plurality of image sensors (406, 408, 410, 412). Each image sensor (406, 408, 410, 412) depicted in FIG. 4 may be embodied as a computing device that detects and conveys information that constitutes an image, for example, by converting the variable attenuation of waves such as light or electromagnetic radiation into signals. Examples of such image sensors (406, 408, 410, 412) can include semiconductor charge-coupled devices ('CCDs'), active pixel sensors, as well as image sensors configured to capture video images, infrared sensors, and so on.

Each image sensor (406, 408, 410, 412) depicted in FIG. 4 is coupled to one of the computing devices (402, 404) in the computing system (400). Each image sensor (406, 408, 410, 412) may be mounted on a particular computing device (402, 404) or otherwise mounted proximate to a particular computing device (402, 404). For example, the image sensor (406, 408, 410, 412) may be attached to an enclosure of a particular computing device (402, 404), the image sensor (406, 408, 410, 412) may be attached to another physical structure within a particular computing device (402, 404), the image sensor (406, 408, 410, 412) may be attached to a mounting apparatus such as a chassis at a location that is physically proximate to the particular computing device (402, 404), and so on.

Each image sensor (406, 408, 410, 412) may be coupled to the particular computing device (402, 404) via an I/O interface such as a USB port, such that images captured by the image sensor (406, 408, 410, 412) may stored locally in memory the resides within the computing device (402, 404) that the image sensor (406, 408, 410, 412) is mounted on. In an alternative embodiment, images captured by the image sensor (406, 408, 410, 412) may be transferred to and stored in memory that resides on another computing device. Ultimately, the images captured by the image sensor (406, 408, 410, 412) may be transferred to the image processing module (430). Readers will appreciate that in other embodiments, an image sensor (406, 408, 410, 412) may mounted upon a mounting apparatus such as a rack and that the image sensors (406, 408, 410, 412) may be communicatively coupled directly to the image processing module (430) via means other than one of computing devices (402, 404) in the computing system (400).

In the example depicted in FIG. 4, multiple image sensors (406, 408, 410, 412) may be coupled to each computing device (402, 404) in the computing system (400). For example, two image sensors (406, 408) are coupled to a first computing device (402) and two additional image sensors (410, 412) are coupled to a second computing device (404). Image data (414, 416, 418, 420) may therefore be received from image sensors (406, 408, 410, 412) coupled to different computing devices (402, 404) in the computing system (400). For example, image data (414, 416) is received from image sensors (406, 408) coupled to a first computing device (402) and image data (418, 420) is also received from image sensors (410, 412) coupled to a second computing device (404).

Readers will appreciate that in other embodiments, additional image sensors may be coupled to each of the computing devices (402, 404). For example, a particular computing device (402) may include a forward facing image sensor that is mounted on the front of the computing device (402), a rear facing image sensor that is mounted on the back of the computing device (402), an interior facing image sensor that is mounted so as to capture the interior of the computing device (402), and so on. Readers will further appreciate that computing systems (402) can include additional computing devices, each of which may include image sensors.

Readers will further appreciate that each of the image sensors (406, 408, 410, 412) may be configured to periodically capture image data (414, 416, 418, 420) according to any number of predefined policies. For example, each of the image sensors (406, 408, 410, 412) may be configured to capture image data (414, 416, 418, 420) upon the expiration of a predetermined interval, each of the image sensors (406, 408, 410, 412) may be configured to capture image data (414, 416, 418, 420) according to a predetermined schedule, each of the image sensors (406, 408, 410, 412) may be configured to capture image data (414, 416, 418, 420) when the associated computing device reboots, and so on. In addition, each of the image sensors (406, 408, 410, 412) may include motion detection capabilities such that the image sensors (406, 408, 410, 412) are configured to capture image data (414, 416, 418, 420) upon detecting motion. In such an embodiment, each of the image sensors (406, 408, 410, 412) may be configured to switch modes (e.g., switch from capturing still images to capturing video data) upon detecting motion.

In the example method depicted in FIG. 4, include receiving (422) image data (414, 416, 418, 420) from a plurality of image sensors (406, 408, 410, 412) may be carried out, for example, by the image processing module (430) receiving one or more messages over a data communications network, where each message includes image data (414, 416, 418, 420) from one or more image sensors (406, 408, 410, 412). The image data (414, 416, 418, 420) may be included in a file that adheres to a predetermined format such as the Camera Image File Format ('CIFF'), a raw image file format, a Joint Photographic Experts Group ('JPEG') format, a video file format, and so on.

The example method depicted in FIG. 4 can also include identifying (424), by the image processing module (430) in dependence upon the image data (414, 416, 418, 420) received from the plurality of image sensors (406, 408, 410, 412), one or more characteristics (426) of the computing system (400). The one or more characteristics (426) of the computing system (400) may include information describing, for example, the relative location of computing devices (402, 204) within the computing system (400), the state of one or more computing components of a particular computing device (402, 404) in the computing system (400), the computing devices (402, 404) in the computing system (400) that a particular computing device (402, 404) is coupled to, and so on.

In the example method depicted in FIG. 4, identifying (424) one or more characteristics (426) of the computing system (400) in dependence upon the image data (414, 416, 418, 420) received from the plurality of image sensors (406, 408, 410, 412) may be carried out by extracting information about the computing system (400) from the image data (414, 416, 418, 420) using one or more image processing techniques. For example, image data (414, 416, 418, 420) captured by one or more of the image sensors (406, 408, 410, 412) may be processed to identify Quick Response Code ('QR code') stickers affixed to a particular computing device (402, 404) whose image was captured by one or more of the image sensors (406, 408, 410, 412), image data (414, 416, 418, 420) captured by one or more of the image sensors (406, 408, 410, 412) may be processed to identify bar code affixed to a particular computing device (402, 404) whose image was captured by one or more of the image sensors (406, 408, 410, 412), and so on.

The image data (414, 416, 418, 420) captured by one or more of the image sensors (406, 408, 410, 412) may also be processed to identify the operational state of components of a particular computing device (402, 404) whose image was captured by one or more of the image sensors (406, 408, 410, 412). For example, image data (414, 416, 418, 420) captured by one or more of the image sensors (406, 408, 410, 412) may be processed to identify fans on a particular computing device (402, 404) that are or are not moving, image data (414, 416, 418, 420) captured by one or more of the image sensors (406, 408, 410, 412) may be processed to identify doors on a particular computing device (402, 404) that closed. Similarly, image data (414, 416, 418, 420) captured by one or more of the image sensors (406, 408, 410, 412) may be processed to identify cables running between two particular computing devices (402, 404) that indicate that the two computing devices (402, 404) are communicatively coupled, and so on.

The example method depicted in FIG. 4 can also include initiating (428), by the image processing module (430) in dependence upon the one or more characteristics (426) of the computing system (400), one or more desired system management actions. A system management action can include actions that impact the operation of the computing devices (402, 404) in the computing system (400). A system management operation can include, for example, turning off a particular computing device (402, 404), altering the manner in which workloads are distributed amongst the computing devices (402, 404), and so on.

Consider an example in which the image data (414, 416, 418, 420) received from the plurality of image sensors (406, 408, 410, 412) indicated that a particular fan on a particular computing device (402) was not operational. In such an example, initiating (428) one or more desired system management actions may include increasing the percentage of workloads that are directed to another computing device (404) while decreasing the percentage of workloads that are directed to the computing device (402) whose fan is inoperable and therefore less capable of performing cooling operations. In such an example, initiating (428) one or more desired system management actions may also include notifying a system administrator that the fan is inoperable, submitting a help request to a centralized repository, and so on.

The example depicted in FIG. 4 illustrates four image sensors (406, 408, 410, 412) mounted on two computing devices (402, 404). Readers will appreciate that embodiments of the present invention may include many additional computing devices and many additional image sensors mounted thereon. For example, a first set of image sensors may be mounted on a first set of computing devices in a first rack in a datacenter, a second set of image sensors may be mounted on a second set of computing devices in a second rack in the datacenter, a third set of image sensors may be mounted on a third set of computing devices in a third rack in the datacenter, and so on. As such, image data may be captured by each set of image sensors that includes images of computing devices in other racks in the datacenter. For example, the first set of image sensors in the first rack may capture images of the computing devices in the second rack, images of the computing devices in the third rack, and so on. Likewise, the second set of image sensors in the second rack may capture images of the computing devices in the first rack, images of the computing devices in the third rack, and so on. By collating all of these images, the image processing module (430) may create a single virtual picture of all of the computing devices in all of the racks of a datacenter. Because the system management module that manages the image sensors and the computing devices in a particular rack has an inventory of the computing devices (e.g., servers, fans, CPUs, network cards) that are located within the particular rack that is managed by the system management module, the single virtual picture can be utilized by a particular system management module to determine where each rack is located relative to each other rack in the datacenter, to determine where each computing device mounted in a particular rack is located relative to each other computing devices mounted within the same rack, to determine where each computing device mounted in a particular rack is located relative to other computing devices mounted in other racks in the datacenter, and so on.

Figure 5:
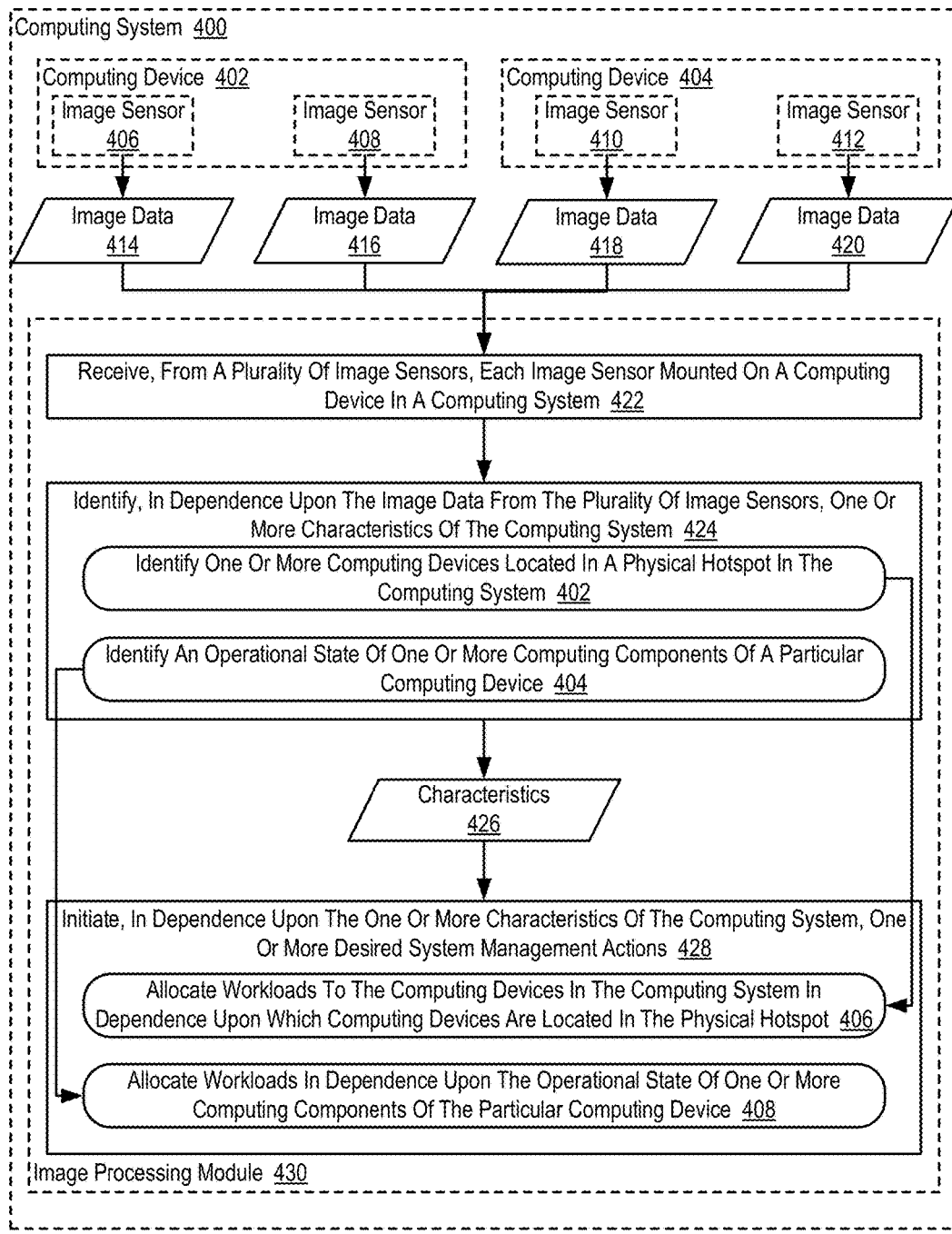
FIG. 5 sets forth a flow chart illustrating an additional example method for managing computing devices in a computing system according to embodiments of the present invention.

For further explanation, FIG. 5 sets forth a flow chart illustrating an additional example method for managing computing devices (402, 404) in a computing system (400) according to embodiments of the present invention. The example depicted in FIG. 5 is similar to the example depicted in FIG. 4, as the example depicted in FIG. 5 also includes receiving (422) image data (414, 416, 418, 420) from a plurality of image sensors (406, 408, 410, 412), identifying (424) one or more characteristics (426) of the computing system (400), and initiating (428) one or more desired system management actions.

In the example method depicted in FIG. 5, identifying (424) one or more characteristics (426) of the computing system (400) can include identifying (502) one or more computing devices located in a physical hotspot in the computing system (400). A physical hotspot represents an area of the computing system (400) where computing devices (402, 404) tend to operate at higher temperatures. Such a physical hotspot may exist, for example, because hot air rises and thereby causes the ambient temperature at the top of computing rack to be higher than the ambient temperature at the bottom of a computing rack. Likewise, because there is a higher concentration of heat-producing computing devices at a first area of the computing system (400) relative to a second area of the computing system (400), because there is a higher concentration of heat-reducing components such as a fan at first area of the computing system (400) relative to a second area of the computing system (400), and so on.

In the example method depicted in FIG. 5, identifying (502) one or more computing devices located in a physical hotspot in the computing system (400) may be carried out, for example, by aggregating image data (414, 416, 418, 420) from a plurality of image sensors (406, 408, 410, 412). In such an example, the image data (414) from a first image sensor (406) may be compared to the image data (416) from a second image sensor (416) to determine whether any portion of the image data (414, 416) contains identical information that can be used to overlay the image data (414, 416) from the two image sensors (414, 416) to create a more complete view of the computing system (400), as illustrated above with reference to FIG. 3. In such a way, the image processing module (430) may examine an image of the entire computing system to identify areas that are heavily concentrated with heat producing computing devices, to identify areas that are heavily concentrated with heat dissipating computing devices, to identify areas that are further away from vents, and so on. Once the physical hotspots within the computing system (400) have been identified, the image processing module (430) may utilize image data to read a bar code that is affixed to a particular computing device that is located within the a hotspot, the image processing module (430) may utilize image data to read a QR code that is affixed to a particular computing device that is located within the a hotspot, or the image processing module (430) may utilize other techniques to obtain the identity of the computing devices that are located within the physical hotspots.

In the example method depicted in FIG. 5, initiating (428) one or more desired system management actions can include allocating (506) workloads to the computing devices (402, 404) in the computing system (400) in dependence upon which computing devices are located in the physical hotspot. In such an example, a higher percentage of workloads may be allocated to those computing devices that are not located in the physical hotspot relative to the percentage of workloads that are allocated to those computing devices that are located in the physical hotspot. In such a way, a workload distribution module may receive a list of computing devices that are located in the physical hotspot from the image processing module (430), and may allocate workloads utilizing such information.

In the example method depicted in FIG. 5, identifying (424) one or more characteristics (426) of the computing system (400) can alternatively include identifying (504) an operational state of one or more computing components of a particular computing device (402). The operational state of a particular computing component may indicate, for example, that the computing component is malfunctioning, that the computing component is being used improperly, that the computing component is coupled to other computing components, and so on. For example, image data (414, 416, 418, 420) captured by one or more of the image sensors (406, 408, 410, 412) may be processed to identify fans on a particular computing device (402, 404) that are or are not moving, image data (414, 416, 418, 420) captured by one or more of the image sensors (406, 408, 410, 412) may be processed to identify doors on a particular computing device (402, 404) that are open or closed, image data (414, 416, 418, 420) captured by one or more of the image sensors (406, 408, 410, 412) may be processed to identify cables running between two particular computing devices (402, 404) that indicate that the two computing devices (402, 404) are communicatively coupled, and so on.

In the example method depicted in FIG. 5, initiating (428) one or more desired system management actions can alternatively include allocating (508) workloads in dependence upon the operational state of one or more computing components of the particular computing device (402). Allocating (508) workloads in dependence upon the operational state of one or more computing components of the particular computing device (402) may be carried out, for example, by allocating workloads only to those computing devices whose heat-dissipating components (e.g., a fan) are operational, by allocating workloads only to those computing devices whose doors are closed as an open door may indicate that the computing device is being serviced, by allocating workloads that operate on highly confidential information only to those servers that are not connected to other servers in an attempt to increase security, and so on.

Figure 6:
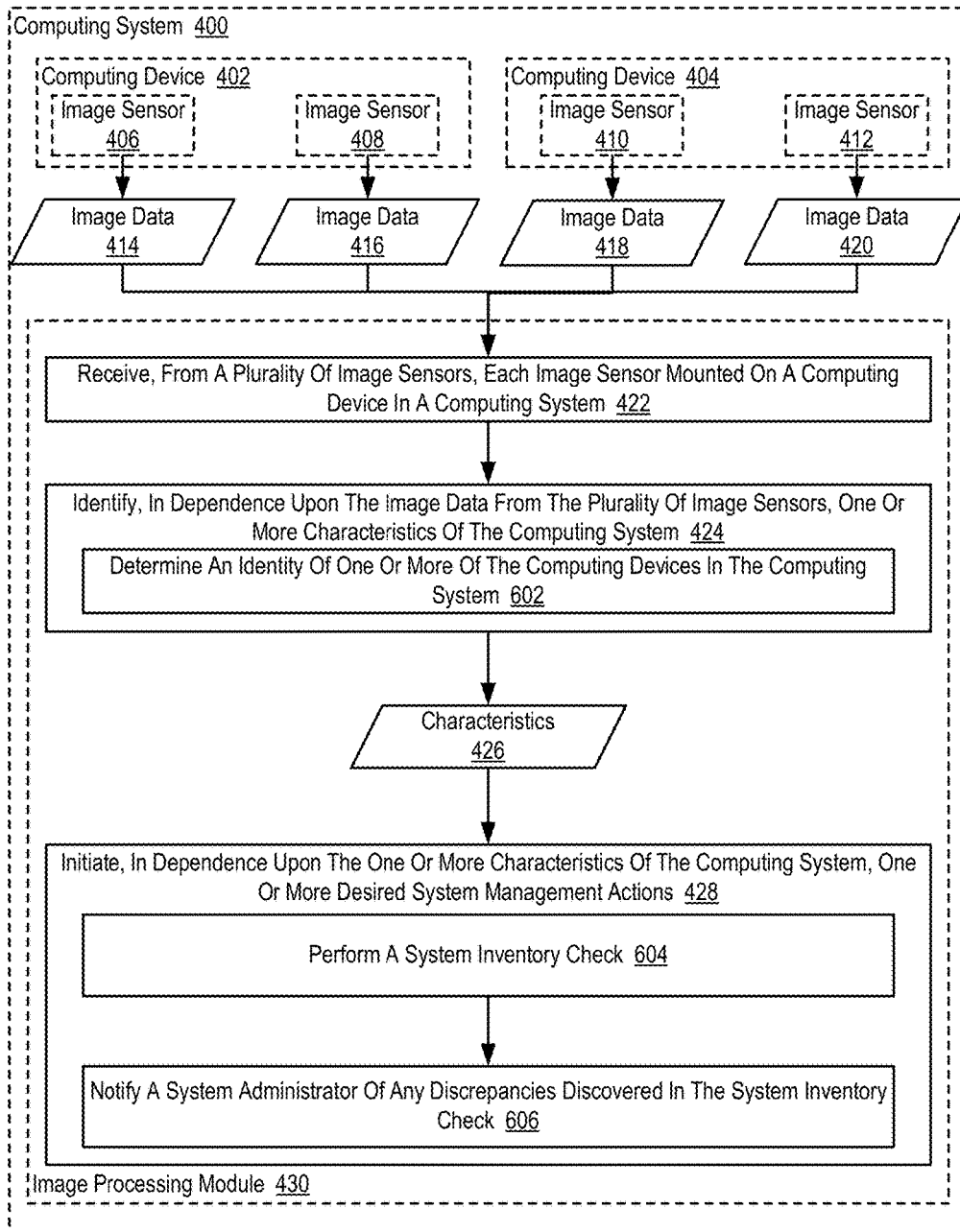
FIG. 6 sets forth a flow chart illustrating an additional example method for managing computing devices in a computing system according to embodiments of the present invention.

For further explanation, FIG. 6 sets forth a flow chart illustrating an additional example method for managing computing devices (402, 404) in a computing system (400) according to embodiments of the present invention. The example depicted in FIG. 6 is similar to the example depicted in FIG. 4, as the example depicted in FIG. 6 also includes receiving (422) image data (414, 416, 418, 420) from a plurality of image sensors (406, 408, 410, 412), identifying (424) one or more characteristics (426) of the computing system (400), and initiating (428) one or more desired system management actions.

In the example method depicted in FIG. 6, identifying (424) one or more characteristics (426) of the computing system (400) can include determining (602) an identity of one or more of the computing devices (402, 404) in the computing system (400). In the example method depicted in FIG. 6, determining (602) the identity of one or more of the computing devices (402, 404) in the computing system (400) may be carried out, for example, by extracting an identifier of the computing device from a bar code affixed to the computing device (400) from image data (414, 416, 418, 420) from one or more of the image sensors (406, 408, 410, 412), by extracting an identifier of the computing device from a QR code affixed to the computing device (400) from image data (414, 416, 418, 420) from one or more of the image sensors (406, 408, 410, 412), and so on.

In an alternative embodiment, determining (602) an identity of one or more of the computing devices (402, 404) in the computing system (400) may be carried out by the image processing module (430) initiating a request for a particular device to illuminate one or more of its indicator lights, the image sensors (406, 408, 410, 412) capturing image data (414, 416, 418, 420), and the image processing module (430) examining the image data (414, 416, 418, 420) to identify the computing device in the computing system (400) whose indicators light are illuminated as requested. In such a way, the network address or other identifier of computing device that received the request to illuminate one or more of its indicator lights may used as the identity of the computing device, whose relative location can be ascertained from the image data (414, 416, 418, 420).

In the example method depicted in FIG. 6, initiating (428) one or more desired system management actions can include performing (604) a system inventory check. A system inventory check may be performed (604) by comparing the identities of each computing device captured through the use of the image sensors (406, 408, 410, 412) to a list or other data structure that identifies all computing devices that are expected to be in the computing system (400). In such a way, missing computing devices may be discovered or computing devices that are not intended to be in the computing system (400) may be identified, such as computing devices that were erroneously installed in the computing system (400).

In the example method depicted in FIG. 6, initiating (428) one or more desired system management actions can also include notifying (606) a system administrator of any discrepancies discovered in the system inventory check. The system administrator may be notified (606), for example, by reporting the discrepancy between the detected devices and the expected devices to a system administration module, by generating an error message that includes the discrepancy between the detected devices and the expected devices to a system administration module, and so on.

Figure 7:
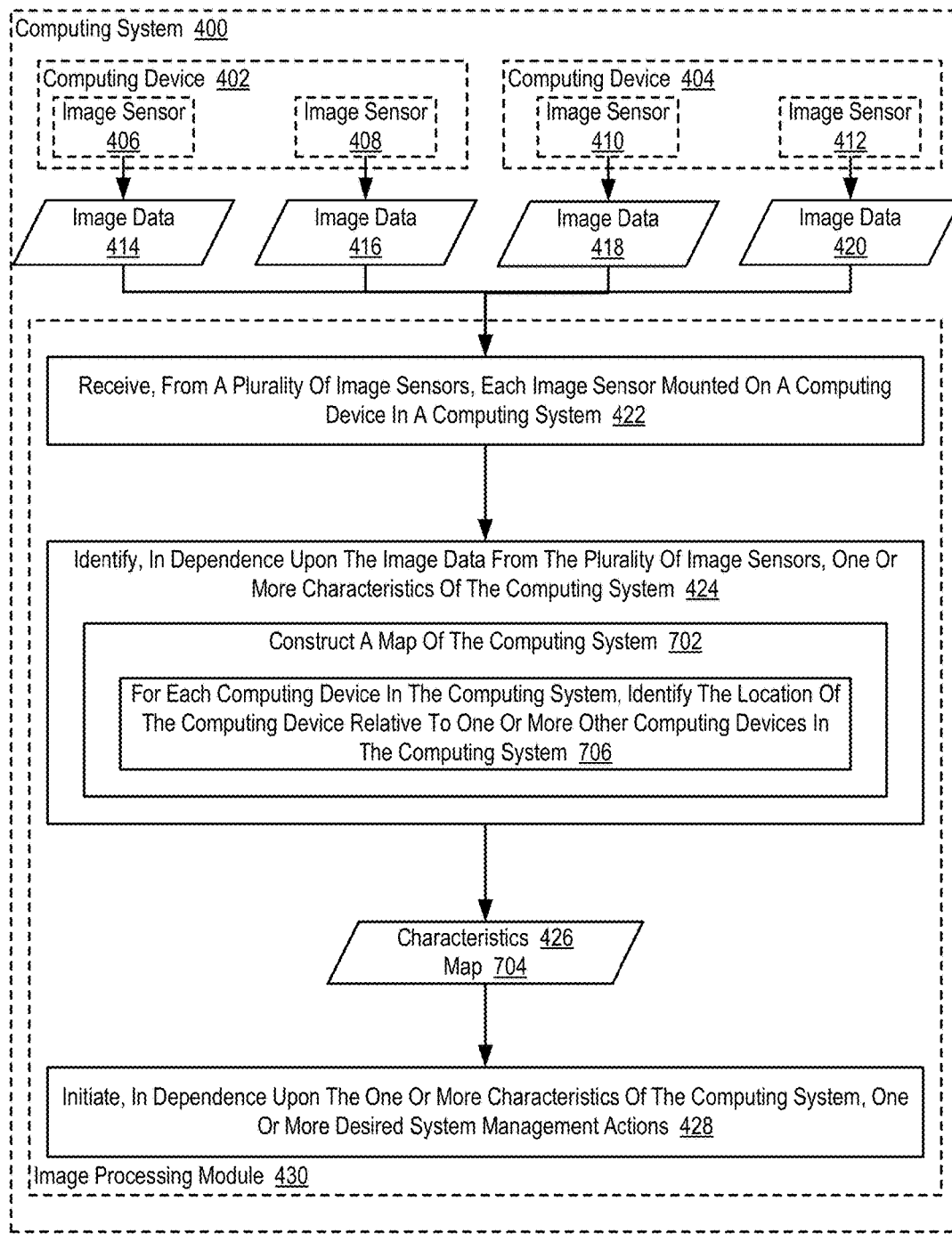
FIG. 7 sets forth a flow chart illustrating an additional example method for managing computing devices in a computing system according to embodiments of the present invention.

For further explanation, FIG. 7 sets forth a flow chart illustrating an additional example method for managing computing devices (402, 404) in a computing system (400) according to embodiments of the present invention. The example depicted in FIG. 7 is similar to the example depicted in FIG. 4, as the example depicted in FIG. 7 also includes receiving (422) image data (414, 416, 418, 420) from a plurality of image sensors (406, 408, 410, 412), identifying (424) one or more characteristics (426) of the computing system (400), and initiating (428) one or more desired system management actions.

In the example method depicted in FIG. 7, identifying (424) one or more characteristics (426) of the computing system (400) can include constructing (702) a map (704) of the computing system (400). In the example method depicted in FIG. 7, the map (704) of the computing system (400) may be embodied as a data structure that includes, for example, the relative location of each computing device (402, 404) in the computing system (400), the coordinate location of each computing device (402, 404) in the computing system (400) relative to a fixed point, information identifying connectivity between two or more computing devices (402, 404) in the computing system (400), and so on. Consider the following example of such a map (704), embodied in this example as a table.

TABLE 1

Computing System Map

| Device ID | Device to left | Device to right | Device above | Device below |
|---|---|---|---|---|
| 0001 | NULL | 0006 | NULL | 0002 |
| 0002 | NULL | 0007 | 0001 | 0003 |
| 0003 | NULL | 0008 | 0002 | 0004 |
| 0004 | NULL | 0009 | 0003 | 0005 |
| 0005 | NULL | 0010 | 0004 | NULL |
| 0006 | 0001 | 0011 | NULL | 0007 |
| 0007 | 0002 | 0012 | 0006 | 0008 |
| 0008 | 0003 | 0013 | 0007 | 0009 |
| 0009 | 0004 | 0014 | 0008 | 0010 |
| 0010 | 0005 | 0015 | 0009 | NULL |
| 0011 | 0006 | NULL | NULL | 0012 |
| 0012 | 0007 | NULL | 0011 | 0013 |
| 0013 | 0008 | NULL | 0012 | 0014 |
| 0014 | 0009 | NULL | 0013 | 0015 |
| 0015 | 0010 | NULL | 0014 | NULL |

In the example depicted in Table 1, the map (704) includes an entry for each computing device that is included in the computing system. Each entry identifies a particular computing device by a device identifier. Each entry also identifies: 1) the computing device that is located to the left of the computing device associated with the entry, 2) the computing device that is located to the right of the computing device associated with the entry, 3) the computing device that is located above the computing device associated with the entry, and 4) the computing device that is located to below the computing device associated with the entry. To aid in the visualization of such a computing system, FIG. 8 includes a block diagram of the computing system described by the map (704) illustrated in Table 1.

In the example method depicted in FIG. 7, constructing (702) the map (704) of the computing system (400) may be carried out by, for each computing device (402, 404) in the computing system (400), identifying (706) the location of the computing device (402, 404) relative to one or more other computing devices (402, 404) in the computing system (400). Identifying (706) the location of a particular computing device (402) relative to one or more other computing devices (404) in the computing system (400) may be carried out, for example, by utilizing image data (414, 416, 418, 420) captured by one or more of the image sensors (406, 408, 410, 412) to determine the angular relationship between the particular computing device (402) and the one or more other computing devices (404) in the computing system (400) from the perspective of the image sensor (406, 408, 410, 412) that captured the image data (414, 416, 418, 420), by utilizing image data (414, 416, 418, 420) captured by one or more of the image sensors (406, 408, 410, 412) to determine the location on a coordinate plane of the particular computing device (402) relative to the one or more other computing devices (404) in the computing system (400) from the perspective of the image sensor (406, 408, 410, 412) that captured the image data (414, 416, 418, 420), and so on.

Figure 8:
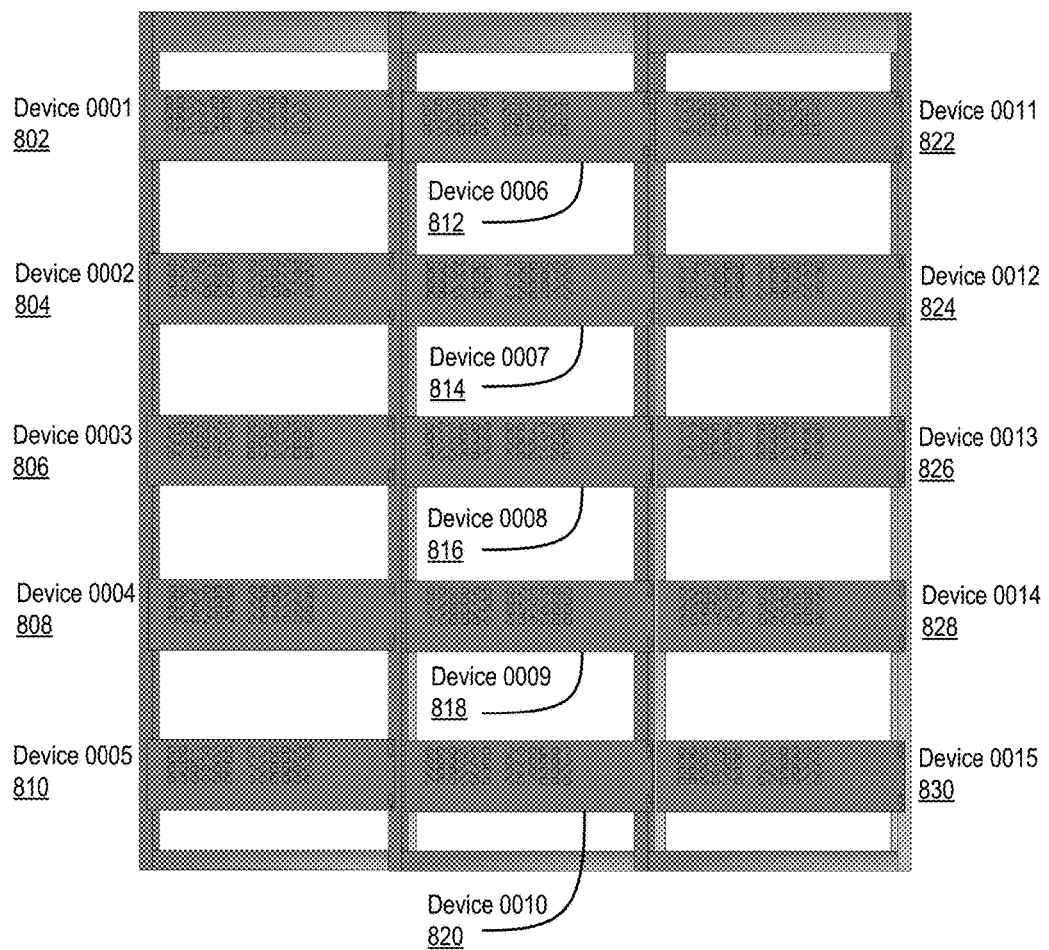
FIG. 8 sets forth a system diagram of a computing system according to embodiments of the present invention.

For further explanation, FIG. 8 sets forth a system diagram of a computing system according to embodiments of the present invention. The computing system depicted in FIG. 8 corresponds to the map described above with reference to FIG. 7. The computing system includes a plurality of computing devices, including device 0001 (802), device 0002 (804), device 0003 (806), device 0004 (808), device 0005 (810), device 0006 (812), device 0007 (814), device 0008 (816), device 0009 (818), device 0010 (820), device 0011 (822), device 0012 (824), device 0013 (826), device 0014 (828), and device 0015 (830).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by first program instructions on a first computing device,
receiving image data from a plurality of image sensors, each image sensor coupled to a computing device in a computing system, wherein multiple computing devices in the computing system are coupled to multiple image sensors;
identifying, in dependence upon the image data from the plurality of image sensors, one or more characteristics of the computing system, including:
aggregating the image data from the plurality of image sensors using overlapping image data to construct a visual map of the physical computing system;
identifying one or more computing devices located in a physical hotspot in the computing system, wherein the hotspot comprises a physical location determined based upon the arrangement of physical features in the visual map of the physical computing system showing greater concentrations of heat producing computing devices, and
identifying an operational state of one or more computing components of a particular computing device, including identifying, using the image data from the plurality of image sensors, whether a fan is moving and whether a door is open; and
initiating, in dependence upon the one or more characteristics of the computing system, one or more desired system management actions, the system management actions comprising allocating workloads to the computing devices in the computing system in dependence upon which computing devices are located in the physical hotspot and in dependence upon the operational state of one or more computing components of the particular computing device.

2. The method of claim 1 wherein:

identifying one or more characteristics of the computing system in dependence upon the image data from the plurality of image sensors further comprises determining an identity of one or more of the computing devices in the computing system; and initiating the one or more desired system management actions further comprises:

performing a system inventory check; and notifying a system administrator of any discrepancies discovered in the system inventory check.

3. The method of claim 1 wherein constructing the map of the computing system further comprises, for each computing device in the computing system, determining the location of the computing device relative to one or more other computing devices in the computing system.

4. An apparatus comprising a computer processor, a computer memory operatively coupled to the computer processor, the computer memory having disposed within it computer program instructions that, when executed by the computer processor, cause the apparatus to carry out the steps of:

receiving image data from a plurality of image sensors, each image sensor coupled to a computing device in a computing system, wherein multiple computing devices in the computing system are coupled to multiple image sensors;

identifying, in dependence upon the image data from the plurality of image sensors, one or more characteristics of the computing system, including:

aggregating the image data from the plurality of image sensors using overlapping image data to construct a visual map of the physical computing system;

identifying one or more computing devices located in a physical hotspot in the computing system, wherein the hotspot comprises a physical location determined based upon the arrangement of physical features in the visual map of the physical computing system showing greater concentrations of heat producing computing devices, and identifying an operational state of one or more computing components of a particular computing device, including identifying, using the image data from the plurality of image sensors, whether a fan is moving and whether a door is open; and initiating, in dependence upon the one or more characteristics of the computing system, one or more desired system management actions, the system management actions comprising allocating workloads to the computing devices in the computing system in dependence upon which computing devices are located in the physical hotspot and in dependence upon the operational state of one or more computing components of the particular computing device.

5. The apparatus of claim 4 wherein:

identifying one or more characteristics of the computing system in dependence upon the image data from the plurality of image sensors further comprises determining an identity of one or more of the computing devices in the computing system; and initiating the one or more desired system management actions further comprises:

performing a system inventory check; and notifying a system administrator of any discrepancies discovered in the system inventory check.

6. The apparatus of claim 4 wherein constructing the map of the computing system further comprises, for each computing device in the computing system, determining the location of the computing device relative to one or more other computing devices in the computing system.

7. A computer program product disposed upon a computer readable, non-transitory storage medium, the computer program product comprising computer program instructions that, when executed, cause a computer to carry out the steps of:

receiving image data from a plurality of image sensors, each image sensor coupled to a computing device in a computing system, wherein multiple computing devices in the computing system are coupled to multiple image sensors;

identifying, in dependence upon the image data from the plurality of image sensors, one or more characteristics of the computing system, including:

aggregating the image data from the plurality of image sensors using overlapping image data to construct a visual map of the physical computing system;

identifying one or more computing devices located in a physical hotspot in the computing system, wherein the hotspot comprises a physical location determined based upon the arrangement of physical features in the visual map of the physical computing system showing greater concentrations of heat producing computing devices, and identifying an operational state of one or more computing components of a particular computing device, including identifying, using the image data from the plurality of image sensors, whether a fan is moving and whether a door is open; and initiating, in dependence upon the one or more characteristics of the computing system, one or more desired system management actions, the system management actions comprising allocating workloads to the computing devices in the computing system in dependence upon which computing devices are located in the physical hotspot and in dependence upon the operational state of one or more computing components of the particular computing device.

8. The computer program product of claim 7 wherein:

identifying one or more characteristics of the computing system in dependence upon the image data from the plurality of image sensors further comprises determining an identity of one or more of the computing devices in the computing system; and initiating the one or more desired system management actions further comprises:

performing a system inventory check; and notifying a system administrator of any discrepancies discovered in the system inventory check.

9. The computer program product of claim 7 wherein constructing the map of the computing system further comprises, for each computing device in the computing system, determining the location of the computing device relative to one or more other computing devices in the computing system.

10. The computer program product of claim 7 wherein the computer readable medium comprises a signal medium.

* * * * *